Figure 1:
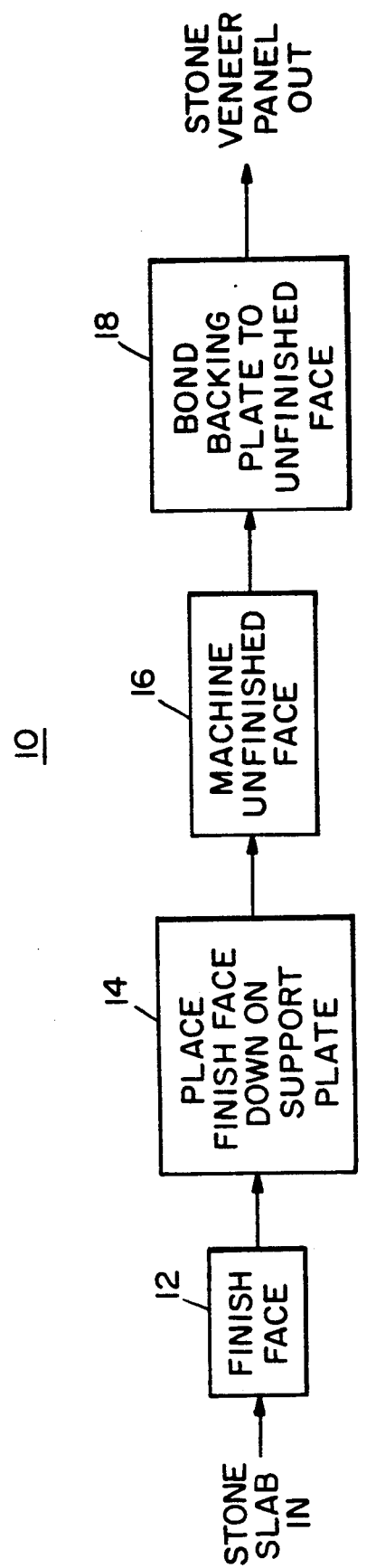

United States Patent [19]

Fodera

[11] Patent Number: 5,004,512
[45] Date of Patent: Apr. 2, 1991

[54] METHOD OF MAKING A STONE VENEER PANEL

[76] Inventor: Frank Fodera, 12 Azalea Rd., Winchester, Mass. 01890

[21] Appl. No.: 396,359

[22] Filed: Aug. 21, 1989

[51] Int. Cl.⁵ .................. B32B 31/00; E04C 2/00
[52] U.S. Cl. .................. 156/153; 51/283 R; 52/612; 52/806; 125/1; 428/15; 428/116
[58] Field of Search .................. 125/1, 15, 25, 35; 156/153, 154; 428/116, 15; 52/806, 612; 51/283 R

[56] References Cited

U.S. PATENT DOCUMENTS

| | | | |
|---|---|---|---|
| 2,655,909 | 10/1953 | Aitchison et al. | 125/1 |
| 2,781,754 | 2/1957 | Aitchison et al. | 125/1 |
| 3,723,233 | 3/1973 | Bourke | 52/612 X |
| 3,878,030 | 4/1975 | Cook | 52/612 X |
| 3,950,202 | 4/1976 | Hodges | 156/154 |
| 3,963,846 | 6/1976 | Bourke | 52/806 X |
| 4,177,789 | 12/1979 | Marocco | 125/1 |
| 4,660,539 | 4/1987 | Battaglia | 125/35 X |
| 4,822,661 | 4/1989 | Battaglia | 52/612 X |
| 4,911,138 | 3/1990 | Leis | 125/35 X |
| 4,914,870 | 4/1990 | Toncelli | 51/34 C X |

Primary Examiner—Michael W. Ball
Assistant Examiner—Jeff H. Aftergut
Attorney, Agent, or Firm—Joseph S. Iandiorio

[57] ABSTRACT

A method of making a stone veneer panel including finishing one face of a slab of stone material; placing the slab finished face down on a support plate; machining the unfinished face to obtain a predetermined thickness of the slab; and bonding a backing sheet to the unfinished face of the stone slab to produce a composite stone veneer panel.

14 Claims, 2 Drawing Sheets

METHOD OF MAKING A STONE VENEER PANEL

FIELD OF INVENTION

This invention relates to a method of making a stone veneer panel, and more particularly to such a method which finishes a face first, then machines the unfinished face to the desired thickness and secures a reinforcing backing sheet to the unfinished face.

BACKGROUND OF INVENTION

Stone veneer panels are in great demand in the construction industry for all types of surfaces from outside wall surfaces to elevator interiors, because of their great natural beauty and light weight as well as economy in use and transportation and ease of installation. However, presently they are difficult to make and are expensive due to high production losses (low yield). Typically an unpolished ⅜ inch thick slab of stone is laminated on each face with a honeycomb backing sheet or a similar structural reinforcing sheet. Then the slab is vertically positioned under a bridge saw and cut vertically down the center of the slab. The two stone veneered panels resulting from the cutting are then each placed in a machine where their respective unattached faces are polished or otherwise finished. This technique suffers a number of shortcomings which result in inefficiency, low yield and consequent low overall production so that supply lags far behind demand. The vertical saw cutting suffers from inaccuracy which results in slab losses of as high as 40%. Further, even in those cases where the slabs are useful after the cutting, the sawed surfaces are often so rough that polishing is unsatisfactory. And even where the cut slabs are suitable for polishing the polishing is still difficult and pieces are lost because of the problems inherent in polishing a thin (¼") slab of stone. A further overriding problem is that when a slab is lost in cutting or finishing, there is also lost the backing sheet and adhesive with all the attendant costs including materials, machine time and labor costs of applying the backing sheet.

Present methods also do not lend themselves well to thermal finishing. Thermal finishing decreases stone strength by as much as 50%, and in this weakened state the stone slabs may be easily broken or destroyed when undergoing current manufacturing techniques.

SUMMARY OF INVENTION

It is therefore an object of this invention to provide an improved method of manufacturing stone veneer panels.

It is a further object of this invention to provide such a method which avoids the use of a saw to make the thickness sizing.

It is a further object of this invention to provide such a method which avoids the need to finish the slabs in their final thinnest form.

It is a further object of this invention to provide a method which avoids destruction of a slab after finishing and/or sizing and does not involve loss of the backing sheet material, and labor and machine costs.

It is a further object of this invention to provide such a method which permits manufacturing panels using very thin stone slabs.

It is a further object of this invention to provide such a method which affords greater accuracy in sizing the final stone slab.

It is a further object of this invention to provide such a method which is faster, more efficient, less expensive, higher in yield and less wasteful.

It is a further object of this invention to provide such a method which is compatible with thermal finishing.

The invention results from the realization that a stone veneer panel can be made more efficiently, economically and quickly by finishing a face first, then machining the unfinished face to obtain the desired thickness and applying backing sheet to that unfinished face.

This invention features a method of making a stone veneer panel by finishing one face of a slab of stone material. Then the slab is placed finished face down on a support plate. The unfinished face is machined to obtain a predetermined thickness for the slab. A backing sheet is then bonded to the unfinished face of the stone slab to produce a composite stone veneer panel.

In a preferred embodiment the finishing may be include polishing, honing, thermal treating or some other finishing technique. The slab of stone material may be approximately ⅛ to ⅜ of an inch thick. The support plate may include a honeycomb structure, and the honeycomb structure may include a reinforcing membrane attached to at least one side. The machining reduces the slab to a thickness of 3/16 to ¼ of an inch or less. The backing sheet may also include a honeycomb structure, and the backing sheet may be bonded to the stone slab with epoxy. The honeycomb structure of the backing sheet may also include a reinforcing membrane attached to at least one side of the honeycomb structure. The machining may include milling, grinding or other suitable techniques.

DISCLOSURE OF PREFERRED EMBODIMENT

Figure 2:
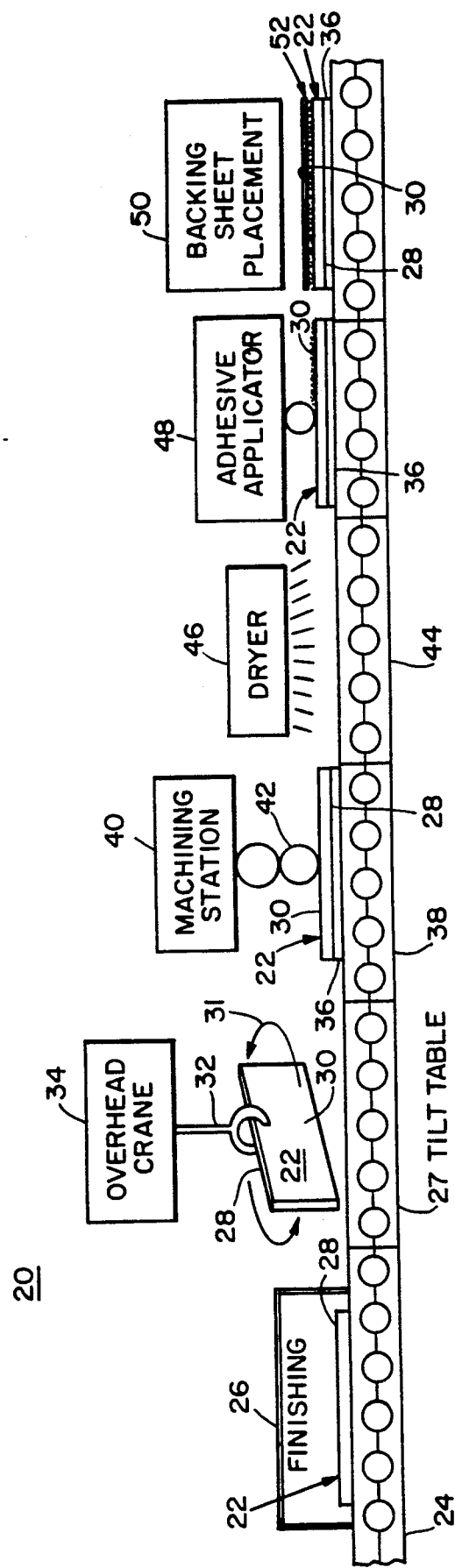

Other objects, features and advantages will occur to those skilled in the art from the following description of a preferred embodiment and the accompanying drawings, in which:

FIG. 1 is a block diagram of the method of making a stone veneer panel according to this invention; and FIG. 2 is a schematic view of a system for carrying out the method of this invention.

The method of making a stone veneer panel according to this invention may be accomplished by finishing one face of a slab of stone material. The stone material may be of any thickness and any material, for example the thicknesses may range from well below ⅜ of an inch on the low side to any thickness on the high side. The material may be any of a variety of stone such as limestone, marble, granite, or any other stone product. Finishing may be done by polishing, heat treating, honing or other suitable techniques. After one face is finished the slab is placed finished face down on a support plate, which may be made of a honeycomb structure, an aluminum or steel plate, cement board, Wonderboard, plastic, or any fairly precise plate which can support the stone slab. The unfinished face is now machined to obtain a predetermined thickness of the slab. Usually a thinner slab is desired such as ¼ of an inch or 3/16 of an inch or less. The machining may include milling, grinding, or any other suitable technique for reducing the thickness of the workpiece. After the machining is complete, a backing sheet is bonded to the unfinished face of the stone slab to produce a composite stone veneer panel. The backing sheet again may be honeycomb, cement board, Wonderboard, aluminum, steel, plastic, or any substantially precise member that reinforces the stone slab. The backing sheet, of whatever nature, may be bonded to the unfinished face of the stone slab using some suitable adhesive such as a two-part epoxy, and the backing sheet, especially if it is a honeycomb structure, may have a membrane such as an epoxy-impregnated fiberglass cloth on one or both sides of the honeycomb structure for added strength.

Although the term "panel" is more often descriptive of a larger area member, that limitation is not relied on here. Panels made by the method of this invention may be small tiles or sections just a few inches square, or large-area members many feet long and wide. The size is really only dependent on the handling capacity of the machinery.

There is shown in FIG. 1 a block diagram of the method 10 of this invention. Initially a stone slab has one of its faces finished, step 12. Then the finished face is placed on a support plate, step 14, after which the unfinished face is machined, such as by milling or grinding, step 16. Then a backing plate is bonded to the unfinished fact, step 18, to complete the stone veneer panel.

The invention may be accomplished by the system 20 as shown in FIG. 2. The stone slab 22 is placed on the first stage 24 of a conveyor and submitted to a finishing station 26 which hones, polishes, thermally finishes or otherwise finishes face 28 of slab 22. Other finishing techniques include sand blasting and bush hammering. After its top face 28 is finished, stone slab 22 moves on to the second conveyor stage 27 which includes a tilt table. The tilt table lifts slab 22 to the vertical or nearly vertical position so that both its finished face 28 and its unfinished face 30 are exposed. A material handling device such as an air suction holder or a mechanical device, gripper 32, from overhead crane 34 rotates slab 22 about a vertical axis, as indicated by arrow 31, so that the faces are reversed. Then slab 32 is once again laid onto the tilt table with a honeycomb structure between it and the tilt table so that the finished face 28 lies face down on the honeycomb support plate. Then, with the slab 22 resting on honeycombed support plate 36, slab 22 is passed to conveyor stage 38 where slab 22 is submitted to a machining operation at machining station 40, which may include for example milling wheels or grinding wheels 42. Here the unfinished face 30 facing upward is machined down to the desired size. Following this, slab 22 on support plate 36 passes to the next conveyor stage 44, where the stone slab is dried, typically by a blower 46 which blows heated air over the stone slab. Further on, after the stone slab is dry, an adhesive applicator 48 applies an adhesive substance to the unfinished face 30, after which at the final station 50 a backing sheet 52 is placed on the adhesive on the unfinished face 30 of slab 22.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of making a stone veneer panel comprising:
   first finishing one face of a slab of stone material;
   then placing the slab finished face down on a support plate;
   machining an unfinished face to obtain a predetermined thickness of the slab; and
   bonding a backing sheet to said unfinished face of said stone slab to produce a composite stone veneer panel.

2. The method of claim 1 in which the finishing includes polishing.

3. The method of claim 1 in which the finishing includes honing.

4. The method of claim 1 in which the finishing includes thermal treating.

5. The method of claim 1 in which said slab of stone material is approximately $\frac{1}{8}$ to $\frac{1}{4}$ of an inch thick before machining.

6. The method of claim 1 in which said support plate includes a honeycomb structure.

7. The method of claim 6 in which there is a reinforcing membrane attached to at least one side of said honeycomb structure.

8. The method of claim 1 in which said machining reduces said slab to a thickness of approximately $\frac{1}{4}$ of an inch or less.

9. The method of claim 1 in which said backing sheet includes a honeycomb structure.

10. The method of claim 1 in which said backing sheet is bonded to said stone slab with epoxy.

11. The method of claim 9 in which there is a reinforcing membrane attached to at least one side of said honeycomb structure.

12. The method of claim 1 in which said machining includes milling.

13. The method of claim 1 in which said machining includes grinding.

14. A method of making a stone veneer panel comprising:
   first finishing one face of a slab of stone material;
   then placing the slab finished face down on a support plate;
   milling an unfinished face to obtain a predetermined thickness; and
   bonding a honeycomb backing sheet to the unfinished face of said slab to produce a composite stone veneer panel.

* * * * *